United States Patent
Freudenberg et al.

(10) Patent No.: US 8,115,347 B2
(45) Date of Patent: Feb. 14, 2012

(54) ELECTRICAL MACHINE HAVING PLASTIC-SHEATHED POLE TEETH, AND A CORRESPONDING METHOD

(75) Inventors: Mark Freudenberg, Unterschleissheim (DE); Markus Jakobi, Fürstenfeldbruck (DE); Josef Maidl, Wallerfing (DE); Michael Menhart, Igling (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/281,198

(22) PCT Filed: Jan. 31, 2007

(86) PCT No.: PCT/EP2007/050939
§ 371 (c)(1),
(2), (4) Date: Aug. 29, 2008

(87) PCT Pub. No.: WO2007/099010
PCT Pub. Date: Sep. 7, 2007

(65) Prior Publication Data
US 2009/0001822 A1 Jan. 1, 2009

(30) Foreign Application Priority Data

Mar. 1, 2006 (DE) .................. 10 2006 009 440

(51) Int. Cl.
*H02K 41/02* (2006.01)
*H02K 41/03* (2006.01)
(52) U.S. Cl. .................. 310/12.02; 310/12.26; 310/181; 310/216.082; 310/216.034
(58) Field of Classification Search .................. 310/181, 310/12.02, 154.09, 216.109, 187, 215, 194, 310/254.1, 154.01–154.41, 12.01–12.33; 29/598, 596; *H02K 1/14, 1/17*
See application file for complete search history.

(56) References Cited

U.S. PATENT DOCUMENTS

| 4,390,307 | A  | * | 6/1983  | Rice ............................. 405/228 |
| 5,334,897 | A  |   | 8/1994  | Casali |
| 5,698,923 | A  | * | 12/1997 | Scherzinger et al. .......... 310/194 |
| 6,522,035 | B1 | * | 2/2003  | Smit ........................... 310/12.18 |
| 6,756,870 | B2 | * | 6/2004  | Kuwahara ..................... 335/224 |
| 6,849,985 | B2 | * | 2/2005  | Jack et al. ................... 310/216.8 |
| 2003/0122440 | A1 | * | 7/2003 | Horst ........................... 310/181 |
| 2003/0122442 | A1 | * | 7/2003 | Jack et al. .................... 310/216 |
| 2004/0034988 | A1 | * | 2/2004 | Neal ............................... 29/596 |
| 2005/0046281 | A1 | * | 3/2005 | Sugita et al. ................... 310/12 |
| 2005/0082934 | A1 | * | 4/2005 | Kawai ........................... 310/181 |
| 2006/0028092 | A1 | * | 2/2006 | Wang et al. ................... 310/260 |

(Continued)

FOREIGN PATENT DOCUMENTS
DE 18 82 073 U 11/1963
(Continued)

*Primary Examiner* — Quyen Leung
*Assistant Examiner* — Terrance Kenerly
(74) *Attorney, Agent, or Firm* — Henry M. Feiereisen; Ursula B. Day

(57) ABSTRACT

The production effort for electrical machines with pole teeth which are fitted with permanent magnets is intended to be reduced. A permanent magnet is inserted between two pole teeth halves (1, 2) for this purpose. The two halves (1, 2) are connected to one another with an interlock by means of a plastic sheath (4). The plastic sheath (4) results in a dimensionally stable pocket (3), in which the permanent magnet can subsequently be inserted. It is therefore possible to insert the permanent magnet as late as possible during the manufacturing process, thus reducing the overall production effort.

6 Claims, 2 Drawing Sheets

U.S. PATENT DOCUMENTS

| | | | |
|---|---|---|---|
| 2008/0185932 A1* | 8/2008 | Jajtic et al. | 310/181 |
| 2008/0252152 A1* | 10/2008 | Gsinn et al. | 310/12 |

FOREIGN PATENT DOCUMENTS

| | | |
|---|---|---|
| EP | 0 932 244 A1 | 7/1999 |
| JP | 2101952 A | 4/1990 |
| JP | 4033562 A | 2/1992 |
| JP | 5015683 U | 2/1993 |
| JP | 2001268835 A | 9/2001 |
| JP | 2003158866 A | 5/2003 |
| JP | 2004088944 A | 3/2004 |
| WO | WO 2005/064767 A1 | 7/2005 |

* cited by examiner

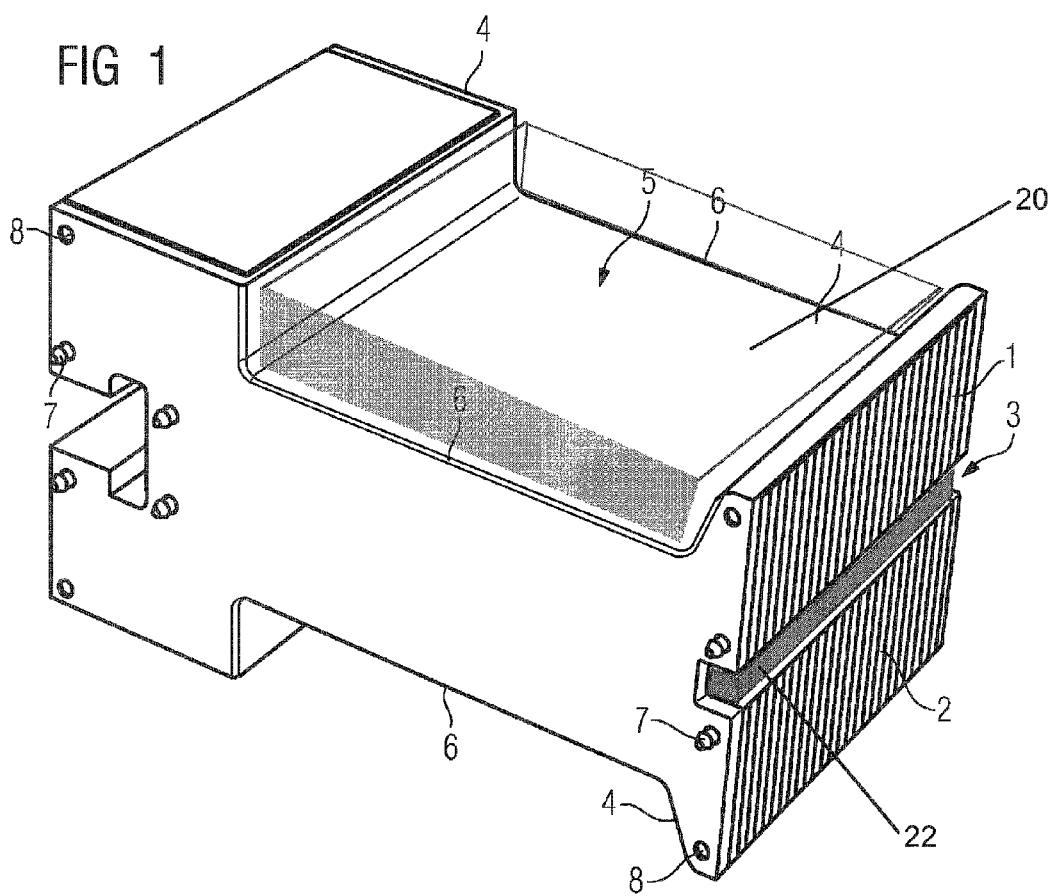

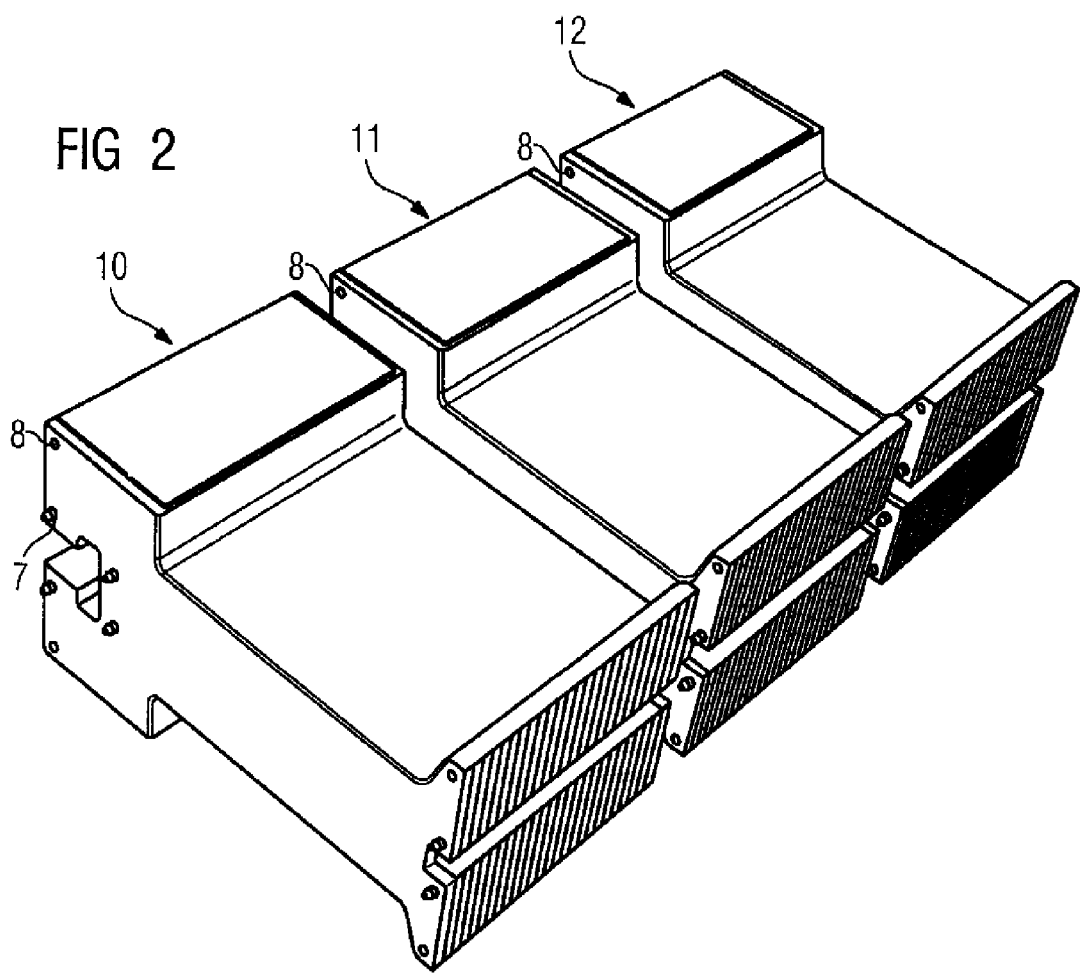

ELECTRICAL MACHINE HAVING PLASTIC-SHEATHED POLE TEETH, AND A CORRESPONDING METHOD

BACKGROUND OF THE INVENTION

The present invention relates to an electrical machine having a first active part which has at least one pole tooth which is fitted with a permanent magnet, and a second active part which is magnetically operatively connected to the first active part for movement relative to one another. The present invention also relates to a corresponding method for production of a pole tooth for an electrical machine. The expression "active part" in this case means, for example, a primary part or a secondary part of a linear motor, or else a stator or rotor of a torque motor. The problem and the solution according to the present invention are described here primarily, however, with reference to a linear motor.

Synchronous linear motors having magnets arranged in the air gap are known. Furthermore, synchronous linear motors have also been developed in which the magnets are embedded in the pole teeth of the primary part. In this case, subsequent magnetization of the magnet blanks is impossible. Ready-magnetized permanent magnets must therefore be used. In order to integrate these permanent magnets into the manufacturing process as late as possible, a modified cut of the motor laminates is required. However, synchronous linear motors such as these with embedded permanent magnets have the disadvantage that the manufacturing process must be carried out with very great care and involves a large amount of effort.

SUMMARY OF THE INVENTION

The object of the present invention is therefore to find an electrical machine design and a corresponding method for production of pole teeth by means of which it is possible to integrate the permanent magnets in the manufacturing process as late as possible.

According to the invention, this object is achieved by an electrical machine having a first active part which has at least one pole tooth which is fitted with a permanent magnet, and a second active part which is magnetically operatively connected to the first active part for movement relative to one another, wherein the pole tooth has two halves between which the permanent magnet is inserted, and the two halves are connected to one another in an interlocking manner by means of a plastic sheath.

In a corresponding manner, the invention also provides a method for production of a pole tooth for an electrical machine by provision of two pole teeth halves, insertion of the pole teeth halves into an injection molding mold, spraying of the injection molding mold with plastic such that a gap which is open to the outside remains between the two pole teeth halves and, once the plastic has cooled down, the pole teeth halves are connected to one another in an interlocking manner by means of a plastic sheath, and insertion of a permanent magnet into the gap.

The injection-molded plastic sheath advantageously allows the production of a dimensionally stable pocket by connection of two teeth halves. This dimensionally stable pocket in the laminated core allows a permanent magnet to be inserted later.

The electrical machine is preferably in the form of a linear motor, with the first active part being a primary part. This makes it possible, in particular, to make use of the advantages of the invention for manufacturing the primary part of a synchronous linear motor.

The plastic sheath may have rounded edges over which winding wires are guided directly. This results in the plastic sheath having the additional function of being a mount for a winding.

Furthermore, it is advantageous for at least one molded element to be cast onto the plastic sheath, for coupling to another plastic sheath. A molded element such as this may be a pin, a clip, a snap-action element or an undercut. Coupling these together makes it possible to form a robust assembly of a plurality of pole teeth in a row or a pole tooth array.

Furthermore, it may be particularly advantageous for the plastic sheaths of a plurality of pole teeth to be integrally connected to one another, so that a tooth module is created. This makes it possible, for example, to firmly couple a plurality of pole teeth to one another along and/or transversely with respect to the direction of movement or packetization direction. This makes it possible to produce entire pole tooth arrays or modules.

BRIEF DESCRIPTION OF THE DRAWING

The present invention will now be explained in more detail with reference to the attached drawings, in which:

FIG. 1 shows a pole tooth with a plastic sheath according to the invention, and

FIG. 2 shows a pole tooth module with a plurality of pole teeth as shown in FIG. 1.

DETAILED DESCRIPTION OF PREFERRED EMBODIMENTS

The exemplary embodiments which will be described in more detail in the following text represent preferred embodiments of the present invention.

The pole tooth, illustrated in FIG. 1, of a synchronous linear motor essentially comprises two halves 1 and 2 which are each laminated or packetized. The two teeth halves are separated from one another, at least on the pole tooth end surface, by means of a gap 3. A plastic sheath 4, which is preferably produced by injection molding, connects the two teeth halves 1 and 2 in an interlocking manner. At the same time, the two teeth halves may be held at a desired distance from one another as well by means of the plastic sheath, thus ensuring the gap 3. A permanent magnet 22 can then be inserted in this gap 3, which may also be referred to as a pocket.

An electrical coil 20 may be wound in the waisted area 5 of the pole tooth. In order to prevent damage to the winding wire, the edges 6 of the plastic sheath 4 are rounded. The plastic sheath is therefore used not only for connection of the pole tooth halves but also as a winding mount. The plastic sheath 4 therefore also acts as slot insulation. A further function of the plastic sheath 4 is to provide edge protection for the pole teeth. In this case, not only are the edges of the pole teeth protected against damage, but protection is also provided against injury from touching the pole teeth laminated cores which intrinsically have very sharp edges.

Inter alia, the plastic sheath 4 absorbs the forces which are created during winding of the pole tooth coil. If required, webs may be injected between the two halves in order to make the pole tooth more robust and to maintain the desired pocket or the desired gap 3.

The two pole tooth halves 1 and 2 are inserted into an injection molding mold for production. The gap 3 is kept free while spraying the mold. Once the plastic sheath 4 has cooled down, the two pole teeth halves 1 and 2 are connected to one in an interlocking manner by the plastic sheath 4. A permanent magnet can then be inserted into the gap 3. Before insertion of the permanent magnet, the pole tooth can still be fitted without any effort in/to the primary part or to a machine part.

On one side surface of the pole tooth, the plastic sheath has pins 7 and holes 8. These are used to join a plurality of pole teeth together in a row, as is indicated in FIG. 2. In this exemplary embodiment, three pole teeth 10, 11 and 12 are connected in a row transversely with respect to the movement direction of the primary part, that is to say in the packetization direction of the pole teeth. They are still shown separately in the illustration in FIG. 2. However, they can be plugged onto one another by insertion of the pins 7 into appropriate holes 8. Once joined together, a pole tooth module is created which can be processed further or fitted as an integral item.

In order to join the pole teeth 10, 11 and 12 to one another, it is also possible to use plastic molded elements other than the pins 7 and holes 8. For example, snap-action elements, clips or other interlocking elements as well as undercuts may be integrally formed on the plastic sheaths, and then interact with corresponding mating pieces on the other pole tooth.

A further embodiment of an electrical machine according to the invention comprises a plurality of pole teeth or pole tooth packets, as are illustrated in FIG. 2, being surrounded by a common, integral plastic sheath. The intermediate walls between the individual laminated cores may be positioned as required. A correspondingly large number of tooth halves are inserted into the injection molding mold during production of the tooth modules. This results in a compact tooth or a compact tooth module with pockets for permanent magnets to be fitted in later.

The plastic sheathing with the aid of an injection molding mold has a further advantage. This is because the laminated cores of a pole tooth or of a pole tooth part have length discrepancies in the packetization direction, which are within the scope of normal manufacturing tolerances. These discrepancies can be compensated for partially by means of the plastic sheathing. The plastic sheaths may then have tighter dimensional tolerances.

The invention advantageously makes it possible to form a dimensionally stable pocket in a laminated core. This means that the plurality of manufacturing steps for an electrical machine or for a primary part of the electrical machine can be carried out without the magnet or the magnets already having to be integrated into the laminated core of the primary part. This makes it possible to reduce the overall production effort.

What is claimed is:

1. A tooth module for an electrical machine having a movable part, the tooth module comprising:
    a plurality of individual pole teeth, each individual pole tooth having two halves and a pole tooth end surface,
    a plastic sheath constructed as a separate component for each individual pole tooth and at least partially surrounding each individual pole tooth in one-to-one correspondence, said plastic sheath configured to interlock the two halves of each individual pole tooth with a gap therebetween, wherein the gap has a predetermined gap spacing defined by the plastic sheath, said gap separating the two teeth halves from one another at least on the corresponding pole tooth end surfaces and forming a pocket which is open only on one side,
    a winding wound on the interlocked individual pole tooth, with the plastic sheath being interposed between the winding and the individual pole tooth, and
    a permanent magnet inserted in the formed pocket.

2. The tooth module of claim 1, wherein the tooth module cooperates with the movable part of a linear motor.

3. The tooth module of claim 1, wherein the plastic sheath comprises rounded edges configured to directly receive winding wires.

4. The tooth module of claim 1, wherein the plastic sheath further comprises at least one integrally molded element for connection to another plastic sheath.

5. The tooth module of claim 4, wherein the integrally molded element comprises a pin, a snap-action element or an undercut.

6. The tooth module of claim 1, wherein the plastic sheath is configured to interlock corresponding halves of a plurality of pole teeth so as to form a tooth module.

* * * * *